United States Patent [19]

Hartness et al.

[11] Patent Number: 4,493,599
[45] Date of Patent: Jan. 15, 1985

[54] ARTICLE DEPALLETIZER

[76] Inventors: Thomas S. Hartness, Rte. 12, Paris Mtn., Greenville, S.C. 29609; Thomas P. Hartness, Rte. 2, Smith Dr., Greenville, S.C. 29607

[21] Appl. No.: 446,234

[22] Filed: Dec. 2, 1982

[51] Int. Cl.³ .............................................. B65G 59/02
[52] U.S. Cl. ................................ 414/120; 294/87 R; 414/113
[58] Field of Search ................ 414/71, 112, 113, 117, 414/118, 119, 120, 121; 198/432, 433, 456; 294/87 R, 67 BB, 87.26, 103, 113

[56] References Cited

U.S. PATENT DOCUMENTS

| | | | |
|---|---|---|---|
| 2,598,222 | 5/1952 | Cahners et al. | 414/71 X |
| 2,841,433 | 7/1958 | Pagdin et al. | 414/71 X |
| 2,986,262 | 5/1961 | Powers | 198/456 X |
| 3,180,499 | 4/1965 | Wildheim et al. | 414/119 |
| 3,534,872 | 10/1970 | Roth et al. | 414/120 |
| 3,777,913 | 12/1973 | Schieser et al. | 198/456 X |
| 4,252,496 | 2/1981 | Williams | 294/87 R X |

FOREIGN PATENT DOCUMENTS

| | | | |
|---|---|---|---|
| 2708160 | 9/1978 | Fed. Rep. of Germany | 294/87 R |
| 2730730 | 1/1979 | Fed. Rep. of Germany | 414/71 |

Primary Examiner—Leslie J. Paperner
Attorney, Agent, or Firm—Dority & Manning

[57] ABSTRACT

A device for depalletizing tiers of articles and depositing said articles carried on a multi-tier pallet A onto a receiving table.

The device includes an elevator clamp C which extends over the multi-tier pallet A and, upon being lowered to the top tier of articles, four spaced walls of the clamp are moved inwardly for gripping the bottles therebetween. The elevator is then raised with the top layer of articles and shifted forward over a receiving table E. The elevator with said articles are lowered for depositing the articles onto the receiving table. Prior to the articles being deposited on the receiving table E, side walls of the receiving table are moved apart so that the articles can be readily received therebetween. After the articles are deposited on the table E, the side walls are brought back together forcing the articles into alignment so that a wiper arm F can shift successive rows of articles onto a table top conveyor G.

13 Claims, 12 Drawing Figures

ARTICLE DEPALLETIZER

BACKGROUND OF THE INVENTION

Heretofore articles such as bottles for receiving soft drinks and the like are stacked on a pallet in multi-tiers with a tier sheet or partition positioned therebetween. When operating a filling machine, such as a drink filling machine, it is necessary to supply these articles to the machine at a very rapid rate. Normally the bottles are first deposited on a receiving table and are then wiped by a wiper arm onto a table top chain which feeds the bottles directly to the filling machine.

Attempts have been made to automatically or semi-automatically depalletize the tiers of articles and feed them to the receiving table. Normally, these devices require the pallet to be positioned in a hole adjacent the receiving table so that a wiper arm can wipe the top tier of the articles from the pallet onto a receiving table. Such a device requires an elevator means for sequentially raising the loaded pallet to a height of one tier.

Examples of such a depalletizers are disclosed in U.S. Pat. Nos. 3,974,922, 4,032,021, U.S. Pat. No. Re. 30,742, 3,070,241, 3,917,082. Other patents developed in the search are U.S. Pat. Nos. 2,695,209 and 2,975,911.

In U.S. Pat. No. 4,109,802, prior to the top tier of articles being wiped off, a clamp is used to restrain the next lower layer against movement.

SUMMARY OF THE INVENTION

In order to overcome the above problems, a depalletizer device constructed in accordance with the present invention is provided for lifting the top tier of articles from a multi-tier pallet and depositing the articles on a receiving table. The depalletizing device includes an elevator clamp which extends over the multi-tier pallet. The elevator clamp is formed by four spaced side walls which are carried in a substantially rectangular configuration and are selectively moved inwardly and outwardly by respective pneumatic cylinders. When it is desired to remove the top tier of bottles from the pallet, the elevator clamp is lowered so that the walls of the clamp are positioned along side of the outer rim of bottles. The pneumatic cylinders are activated drawing the walls inwardly applying pressure to the outermost bottles of the tier from all four sides. This clamping pressure enables the bottles to be lifted as a tier and transported by the elevator clamp over a receiving table. The operation of the elevator clamp is semi-automatic. When the elevator clamp with the bottles therein is positioned over the receiving table, a side wall of the receiving table is shifted relative to an opposed side wall ensuring that there is sufficient space therebetween for permitting the tier of articles to be deposited on the table without striking the top of a side wall. The tier sheet is then manually removed off the top of the tier of bottles.

Normally, the articles are positioned in a rickrack configuration in each tier so as to conserve space and after the articles are deposited on the receiving table, at least one wall is moved inwardly for compressing and aligning the articles on the receiving table. The elevator is then raised and a wiper arm, which extends over the receiving table, is selectively moved shifting the articles in rows off the receiving table onto a table top conveyor either singularly or in groups. A photoelectric sensor means is associated with the table top chain for activating the wiper arm when space becomes available on the table top chain.

As a result, as long as bottles or articles are placed on the receiving table, a continuous flow of articles is fed onto the table top conveyor.

While the embodiment of the invention disclosed herein is shown and described as being semi-automated, it is to be understood that the operation could be made automatic.

Accordingly, it is an important object of the present invention to provide a device for semi-automatically removing tiers of articles from a multi-tier pallet.

Another important object of the present invention is to provide a device for removing articles from a pallet and depositing said articles onto a receiving table.

Still another important object of the present invention is to provide a device which can be readily positioned adjacent a receiving table for receiving articles from a pallet and depositing same on the receiving table.

Still another important object of the present invention is to provide a simple and efficient device for removing articles from a multi-tier pallet.

Another important object of the present invention is to provide a depalletizing device which ensures that the bottles are centered on a receiving table upon being deposited thereon.

Another important object of the present invention is that the operator remains at floor level during operation.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DRSCRIPTION OF THE PREFERRED EMBODIMENT

Figure 1:
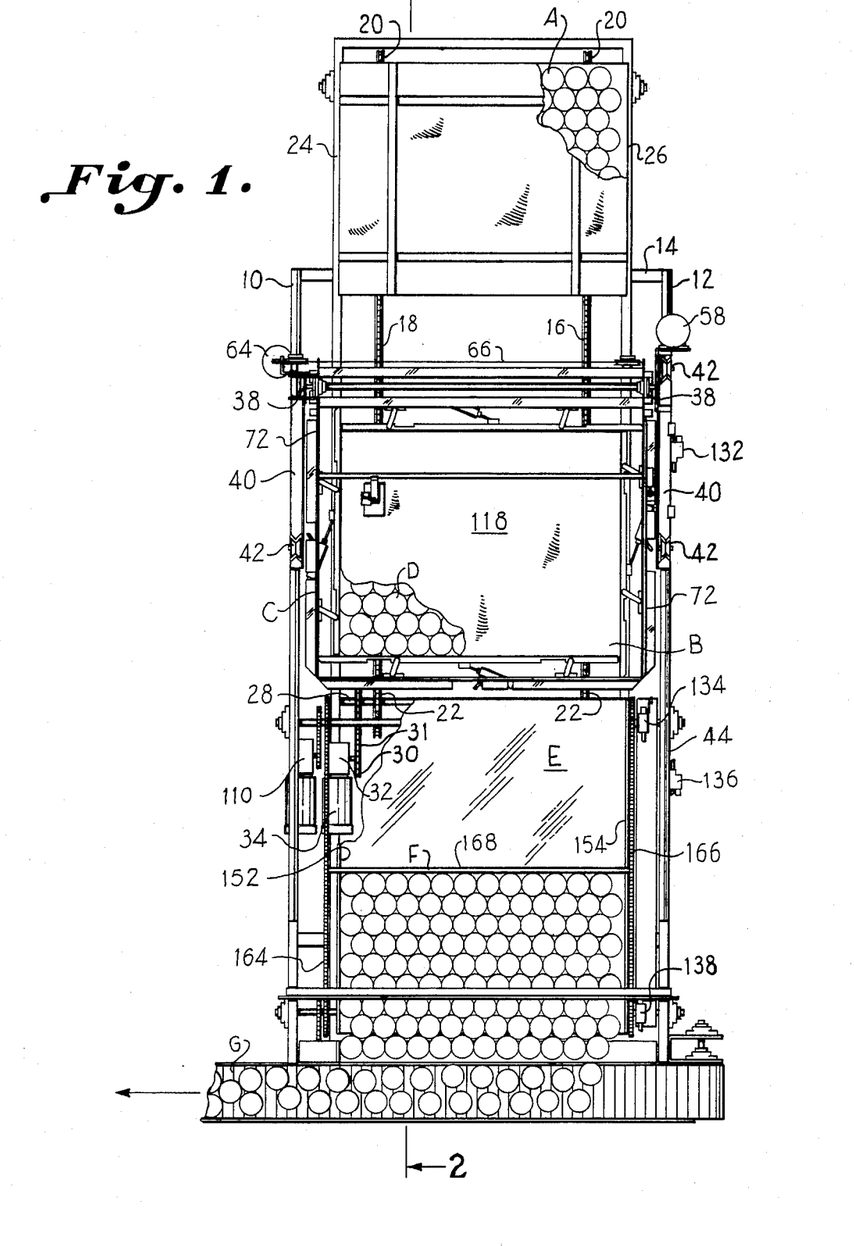
FIG. 1 is a plan view illustrating a depalletizing device constructed in accordance with the invention.

Referring to FIG. 1 of the drawings, there is illustrated a device for depalletizing tiers of articles carried on a multi-tier pallet and depositing articles on a receiving table.

Figure 2:
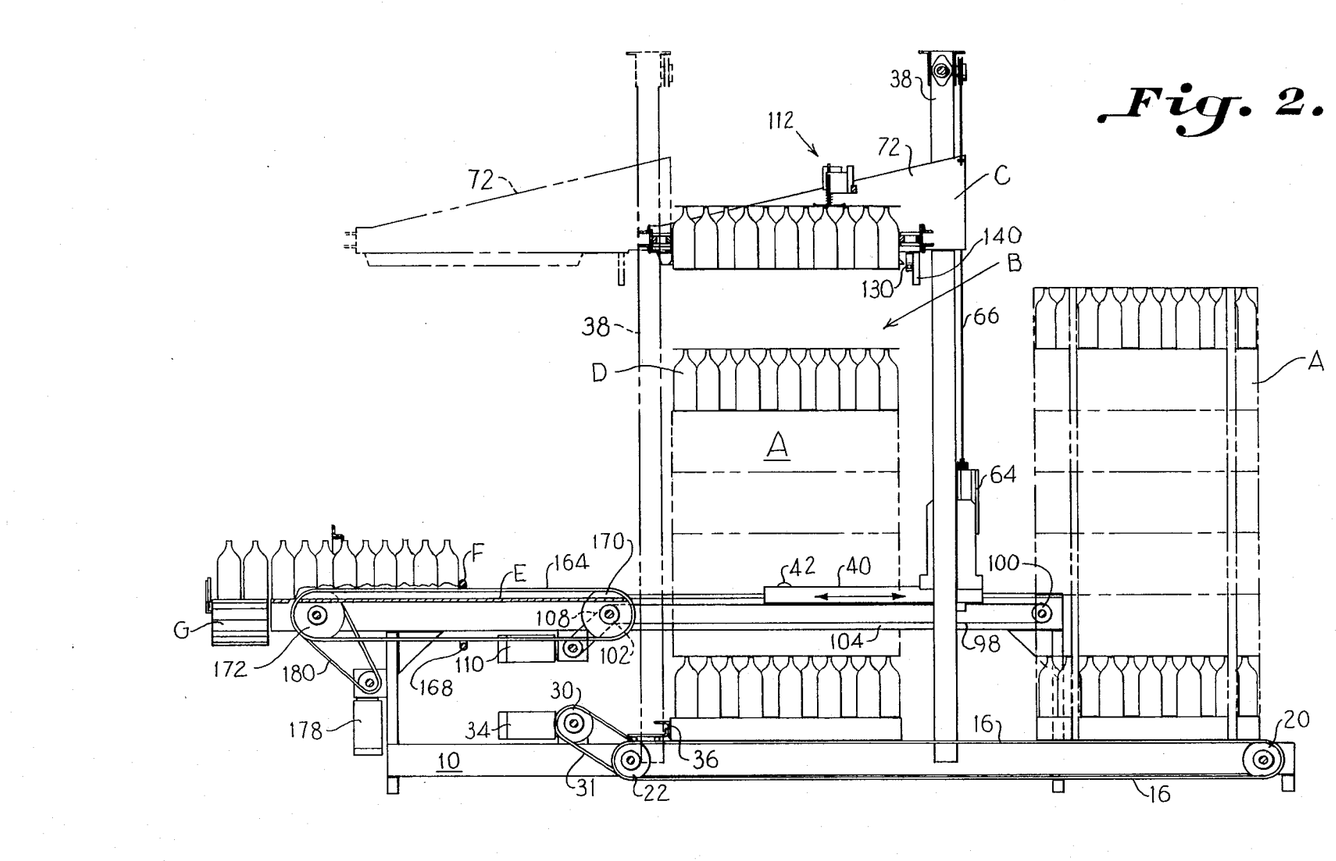
FIG. 2 is a side elevational view of the depalletizing device.

Referring to FIGS. 1 and 2, a multi-tier pallet A is positioned adjacent one end of the device. The pallet is moved to a position B underneath an elevator clamp C so that successive tiers of articles D can be removed and transported over a receiving table E and deposited thereon. A wiper arm means F wipes the articles off said receiving table E in successive rows onto a table top conveyor G which, in turn, supplies the bottles to a filling machine.

Referring to FIGS. 1 and 2 of the drawing, the depalletizer is constructed of any suitable angle iron and includes side frame members 10 and 12 which are joined by suitable end bracings 14. A pallet A containing a plurality of vertically stacked tiers of articles such as bottles is loaded on one end of the device upon a movable chain conveyor which includes a pair of elongated spaced chains 16 and 18. The chains are, in turn, journaled between sprockets 20 and 22 that are carried on shafts extending between elongated side bracings 24 and 26. A shorter chain 31, which extends between another sprocket carried on the shaft 28 and a sprocket 30 carried on the output of a gear box 32, is provided for rotating the chains 16 and 18. The gear box 32 is directedly coupled to an electric motor 34. Therefore, when it is desired to shift the pallet from the end of the device as shown in FIG. 2 to the unloading position, the electric motor 34 is merely turned on by a spring loaded switch until the chain drives the pallet up against an abutment 36.

Once the pallet is in the unloading position, an elevator clamp C is activated for removing the top tier of bottles from the pallet A and shifting the top tier to the left as shown in FIGS. 1 and 2 over the receiving table E for being deposited thereon.

The elevator clamp C is supported on a pair of laterally spaced vertically extending frames 38 which are, in turn, fixed to respective horizontally extending arms 40. The arms 40 have rollers 42 provided thereon which ride on an inverted angle member 44 as the entire elevator clamp is shifted from the center pallet unloading position to the position wherein it deposits the bottles on the receiving table E.

Figures 3, 4, 5:
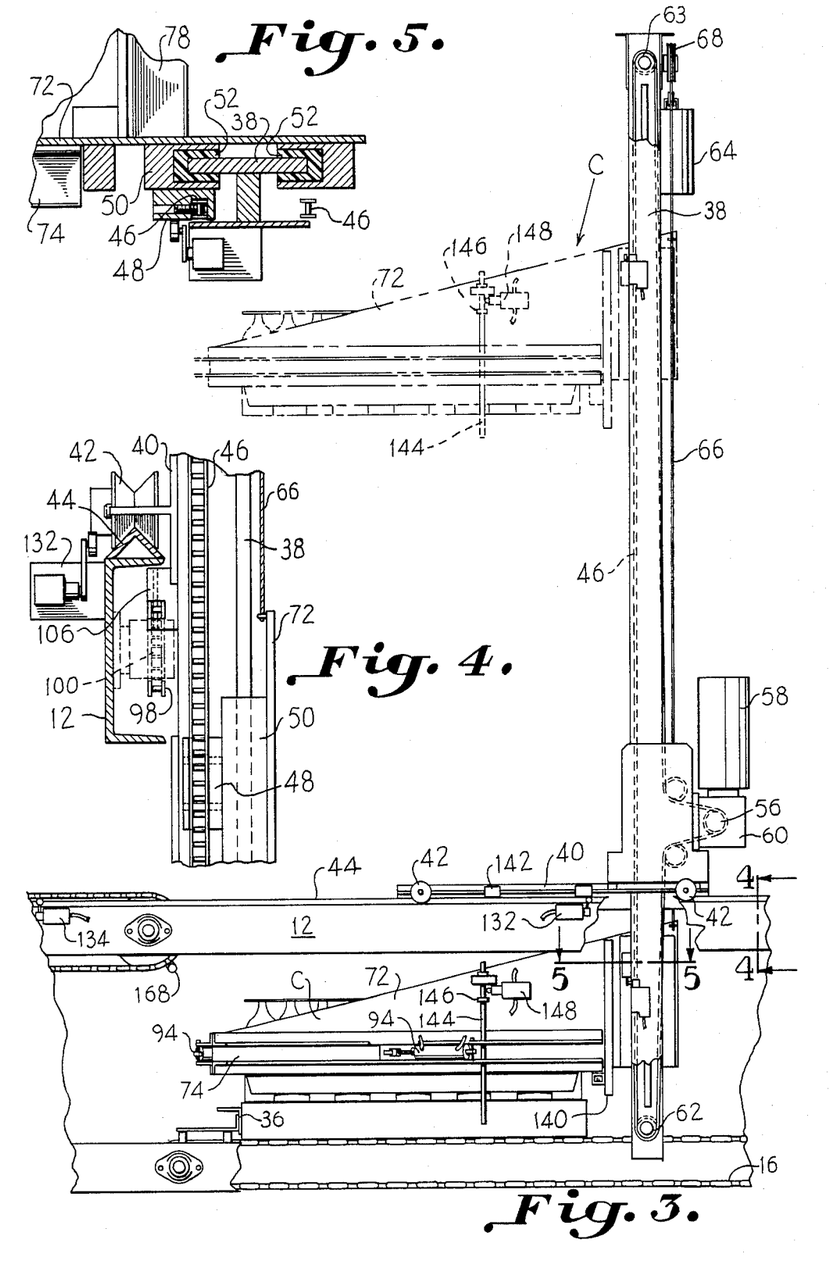
FIG. 3 is an enlarged elevational view illustrating an elevator clamp forming part of the invention in two different positions.
FIG. 4 is a sectional view taken along line 4—4 of FIG. 3 showing a drive for the elevator clamp.
FIG. 5 is a sectional view taken along line 5—5 of FIG. 3.

The elevator clamp mechanism C is supported on a vertically running chain 46 and is fixed thereto through a block 48 (FIGS. 3, 4 and 5). The block 48 is, in turn, fixed to a channel member 50 having a non-metallic bearing surface 52 therein which rides on the vertically extending track portion of the vertical upright 38. The chain 46 extends around a driven sprocket 56 that is, in turn, driven by electric motor 58 through a gear reduction box 60.

The lower run of the chain extends around a lower sprocket 62 and the upper run extends around sprocket 63. When it is desired to raise and lower the elevator clamp, the motor 58 is energized to be driven in the appropriate direction. Such is accomplished by manipulating a joystick (not shown).

A counterweight 64 is connected by means of a cable 66 extending around a pulley 68 to the elevator clamp C. Such is a safety device to prevent rapid dropping of the elevator clamp in the event of chain breakage and also to extend the life of the drive mechanism for raising and lowering the elevator clamp due to the fact that it is counterweighted.

The elevator clamp includes a pair of spaced substantially triangularly-shaped side plates 72 which are, in turn, attached to the bearing blocks 50 which, as previously mentioned, ride up and down on the track 38 during raising and lowering of the elevator clamp.

Figure 6:
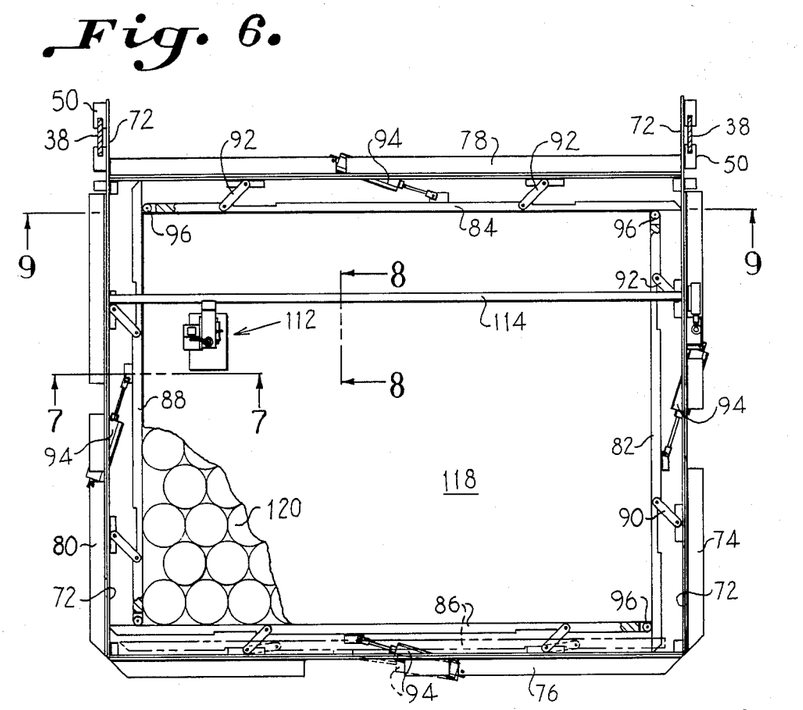
FIG. 6 is an enlarged plan view illustrating the clamping walls forming part of the elevator clamp.
Figures 7, 8:
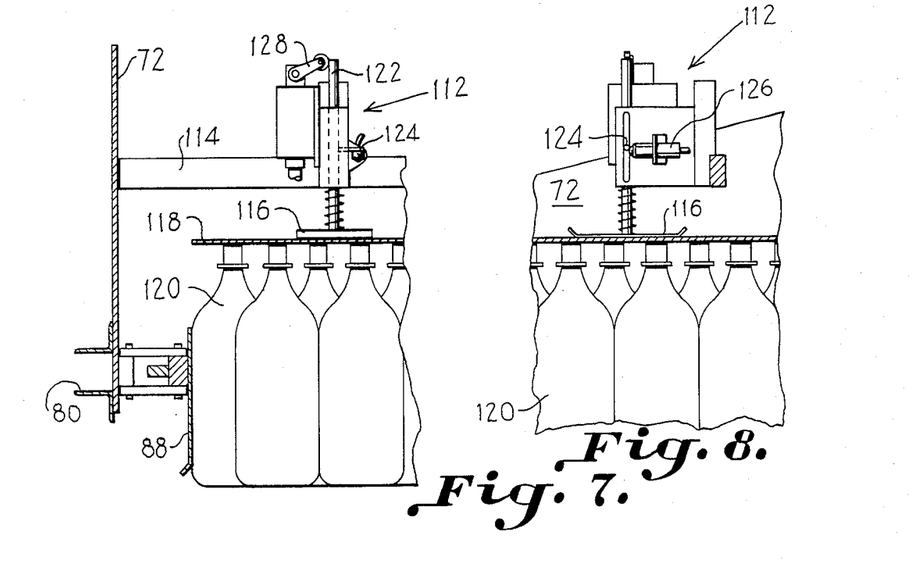
FIG. 7 is a sectional view taken along line 7—7 of FIG. 6 showing a switching element for the elevator clamp.
FIG. 8 is a sectional view taken along line 8—8 of FIG. 6 showing a switching element for the elevator clamp.
Figures 9, 10:
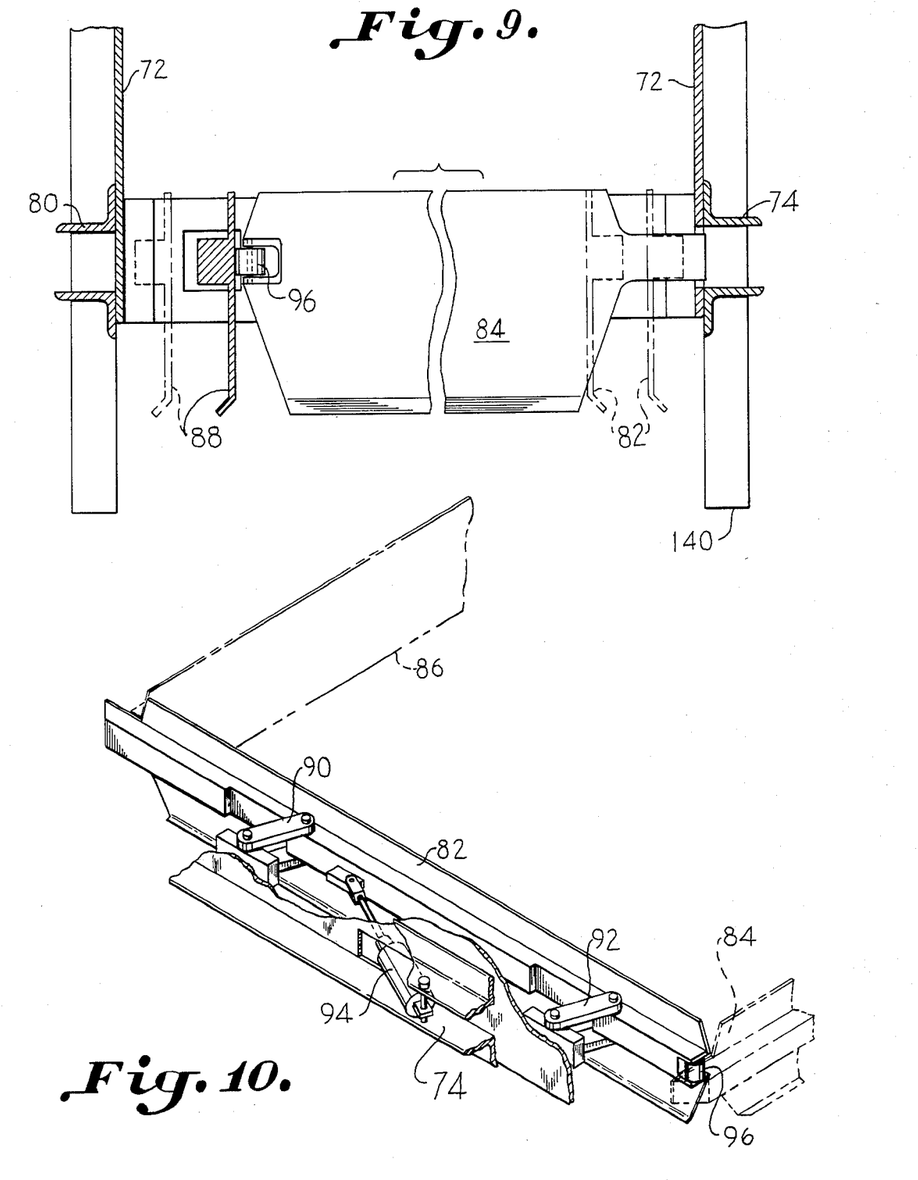
FIG. 9 is a sectional view taken along line 9—9 of FIG. 6 showing two of the walls of the clamp forming part of the elevator clamp.
FIG. 10 is an enlarged perspective view illustrating the relationship of three walls of the elevator clamp.

Supporting angle iron members 74, 76, 78 and 80 are secured together in a rectangular configuration and attached between the spaced triangularly-shaped side plates 72 as shown in FIGS. 5 and 6. Pivotably carried within these angle iron members 74, 76, 78 and 80 are side clamping walls 82, 84, 86 and 88. Each of the side clamping walls operate in substantially the same manner and as a result, only one will be described in detail (FIG. 10). For example, the side clamping wall 82 is connected by means of pivot levers 90 and 92 to the side wall 74. A double-acting pneumatically operated cylinder 94 extends between the fixed angle member 74 and the movable wall 82 so that it can be moved from a retracted open position to an extended closed position for grasping and releasing the tiers of bottles along their side walls. In FIG. 6, the movable walls 82, 84, 86 and 88 are shown in their closed position grasping a tier of bottles.

The ends of the movable walls 82, 84, 86, and 88 overlap when being moved to the closed position and in order to facilitate this overlapping relationship, rollers 96 are carried on one end of each of the pivotable side walls for permitting ready movement between the side walls during the closing operation.

As can be seen in FIG. 9, when the four side walls 82, 84, 86 and 88 are moved from the open to the closed position, the wall 88 moves from the phantom line position to the full line position. The wall 82, in turn, moves from the outer phantom line position to the inner phantom line position.

Like reference numerals are used throughout the application for designating similar parts, in particular, the parts for manipulating the movable clamping walls 82, 84, 86 and 88.

A driven chain 98 is provided for shifting the elevator clamp C from the position shown in full lines in FIG. 2 where it removes the articles from the pallet to the phantom line position over the receiving table E. The chain 98 is carried on a pair of spaced sprockets 100 and 102 which are, in turn, secured to the channel iron side wall 12. The horizontal member 40 is attached to the chain 98 through a block 106 so that by rotating the chain 98 in the clockwise and counterclockwise direction, the elevator clamp C can be moved back and forth between the two positions shown in FIG. 2. The drive for the chain 98 is through an intermediate coupling chain 108 that is coupled to the output of an electric motor 110 though a gear box.

The energization of the motor 110 is under control of a joystick so that when the joystick is manipulated in the forward direction, the elevator will move in the forward direction until it reaches a limit switch to properly position it over the receiving head. After depositing the bottles on the receiving table E, the joystick is manipulated to raise the elevator cradle and then moved to a rear position for returning the elevator cradle to its initial position over the multi-tier pallet.

The closing of the clamp carried by the elevator as well as the downward movement of the elevator is under control of a switch mechanism generally designated by the reference character 112. The switch element 112 is carried on a horizontally extending bar 114 (see FIG. 6) which is carried above the clamping side walls 82, 84, 86 and 88. The downward movement of the elevator is initiated by moving the joystick downward. This energizes the motor 58 rotating the chain 46. As the elevator is lowered, a spring-loaded foot 116 strikes a tier sheet 118 carried on top of the articles 120. Upon striking the tier sheet 118, a vertically extending plunger 122 is raised. A horizontally extending post 124 is carried by the plunger for striking a pneumatic switch 126. Immediately prior to the pneumatic switch 126 being activated, a limit switch 128 is struck by the top of the vertical shaft 122 stopping the downward movement of the elevator by de-energizing motor 58.

After the elevator has been stopped, the pneumatic switch 126 is activated as described above allowing compressed air to be fed to the double acting cylinders 94 associated with the side walls 82, 84, 86 and 88 of the clamp clamping the articles 120 therebetween.

The joystick is then moved to an upper position raising the elevator clamp C until a photoelectric switch 130, which emitts a light beam to a reflective surface carried on the other side of the elevator, produces a reflected light beam indicating that the clamp and bottles have cleared a certain height. Such ensures that the bottles and clamp are above the height of the receiving table and the bottles carried thereon. Any suitable limit switch could be utilized for limiting the maximum upward movement of the elevator.

Limit switches 132, 134, 136 and 138 are carried on the side frame of the machine for stopping the appropriate drive motors associated with the device. The limit switch 132, as shown in FIG. 1, is provided for limiting the rearward movement of the elevator clamp after the joystick has been pushed rearward to energize the motor. The limit switch 132 strikes a cam carried on the horizontal member 40. The downward movement of the elevator over the receiving table E is under control of the limit switch 134 which is struck by a downwardly extending shaft 140 when the elevator is lowered. This, in turn, de-energizes the motor 58 associated with the elevator clamp. The forward movement of the elevator clamp C for properly positioning the elevator clamp over the receiving table E is under control of the limit switch 136. An arm of the limit switch 136 strikes a cam 142 carried on the horizontal member 40 for de-energizing the drive motor 110.

When the elevator clamp is properly positioned over the receiving table, the joystick is moved downwardly causing the elevator to be lowered downwardly over the receiving table E until the limit switch 134 is activated stopping the downward movement. A plunger 144 which is carried by the elevator clamp strikes side rail of the frame 12 forcing the plunger 144 upward. As the plunger 144 is forced upwardly, a collar 146 strikes a pneumatic switch 148 allowing compressed air to be fed to the opposite ends of the pneumatic cylinder 92 associated with the clamp for releasing the bottles 120.

Figure 12:
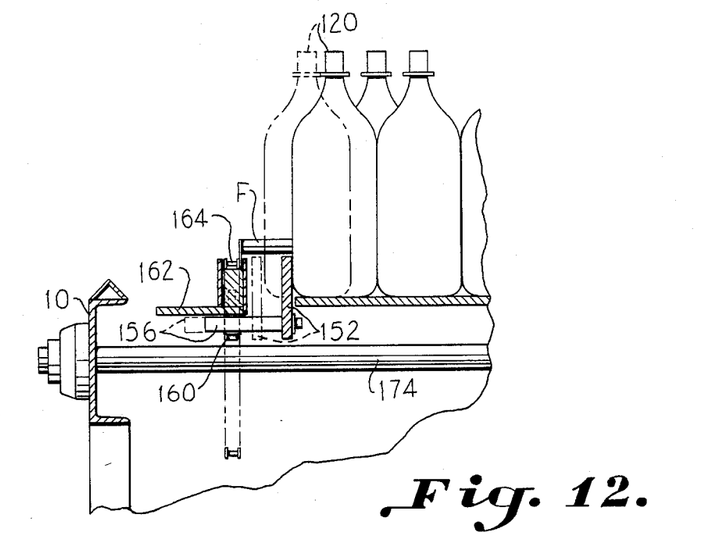
FIG. 12 is a sectional view taken along line 12—12 of FIG. 11 showing the two different positions of the side wall adjacent with the receiving table.

The limit switch 134 performs another function other than stopping the downward movement of the elevator clamp C. In addition, it activates a solenoid valve associated with a pneumatic cylinder 150 which is, in turn, connected to a movable side plate 152 carried on one side of the receiving table E. It moves the side plate 152 outwardly as shown in FIG. 12 so that the bottoms of the bottles will not strike its upper surface when the bottles are deposited on the receiving table E. However, it is important that the bottles be maintained in their rick-rack position so that when the wiper arm F is moved forward, the bottles will be shifted in rows as shown in FIG. 1 onto the table top chain conveyor G.

Figure 11:
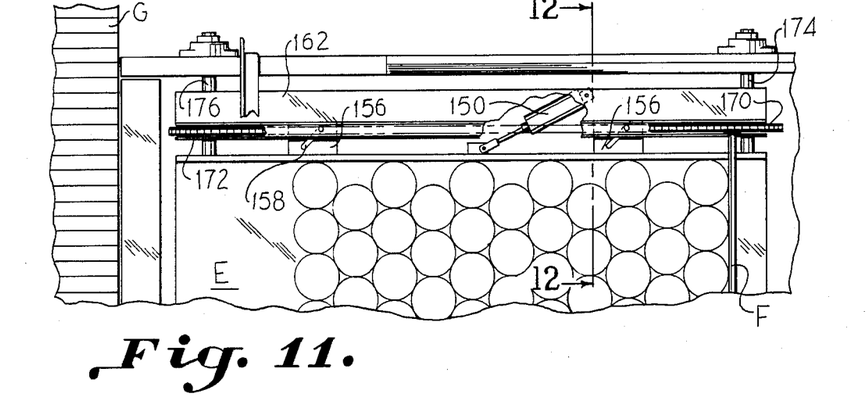
FIG. 11 is an enlarged plan view illustrating one movable wall which extends adjacent the side of a receiving table.

The side wall 154 carried on the opposite side of the receiving table from the removable wall 152 remains fixed. The movable wall 152 has a pair of horizontal brackets 156 secured to the bottom thereof which have an elongated slanted slot 158 provided therein through which a bolt 160 extends. The bolt 160 is, in turn, secured to the bottom of the frame member 162. Such provides a guide for the side wall as it is moved in and out by maniplating the pneumatic cylinder 150.

The wiper arm assembly F includes a pair of laterally spaced chains 164 and 166 which have a horizontal rod 168 secured therebetween. The chains are, in turn, suitable carried on sprockets 170 and 172 carried on shafts 174 and 176 journaled between the side walls of the frame. As show in FIG. 2, the sprocket for the chain 166 is driven by the motor 178 by means of a chain 180.

The operation of the wiper arm is initiated by depressing a pushbutton on a control pedal. Once the pushbutton is depressed, the control of the wiper arm is taken over by a photo cell extending over the table top conveyor G. When the photocell indicates that there are no bottles on the table top conveyor G, then it restarts the motor 178 causing the chain to be rotated until the wiper arm 168 moves one or more rows of bottles onto the conveyor B according to a predetermined adjustment. Once the light beam is again broken by the bottles on conveyor G, the wiper arm is stopped. This sequence of operation continues until a cam on the chain 166 strikes the limit switch 138 carried adjacent the end of the receiving table ending the cycle.

While a preferred embodiment of the invention has been described using specific terms, such description is for illustrative purposes only, and it is to be understood that changes and variations may be made without departing from the spirit or scope of the following claims.

What is claimed is:

1. A device for depalletizing tiers of articles located on a pallet, one tier at a time, and depositing said articles on a receiving table comprising:
   an elevator clamp means for moving a tier of articles which extends over said pallet,
   (i) four interdependent spaced side walls carried in a substantially rectangular configuration, each side wall having a first and a second end, bearing means at said first end, a clamping surface generally between said first and second end, said bearing means of each said side wall bearing against said clamping surface of a next adjacent side wall;
   (ii) means for selectively moving said side walls between a closed position and an opened position;
   elevator means for lowering said elevator clamp in an opened position to a position wherein said walls of said clamp encompass the top tier of articles on said pallet;
   said means for moving said side walls closing said clamp so that said bearing means of each said side wall bears on and moves against said clamping surface of said next adjacent side wall so that said first ends of said side walls move along said clamping surface inwardly past the second ends of said side walls to provide a uniform clamping force against said articles clamping said top tier of articles therebetween; and means for raising said elevator clamp with said top tier of articles and moving said elevator clamp with said articles over a receiving table and depositing said articles on said receiving table.

2. The device as set forth in claim 1 further comprising:
a driven table top conveyor positioned adjacent said receiving table;
a wiper arm means extending over said receiving table for selectively moving said articles off said receiving table onto said table top conveyor when activated, and
sensing means activating said wiper arm means when sufficient space is provided on said table top conveyor for receiving additional articles.

3. The device for depalletizing tiers of articles as set forth in claim 1 further comprising:
a pair of positioning walls carried on opposed sides of said receiving table;
means for moving at least one of said positioning walls between an opened and closed, position for varying the spacing between said positioning walls;
said positioning walls being moved to an opened position for receiving said articles on said receiving table and being moved to a closed position for centering said articles on said table.

4. The device for depalletizing tiers of articles as set forth in claim 1 further comprising:
said means for opening and closing said side walls including pneumatic cylinders pivotally connected to said side walls of said clamp for selectively moving said side walls to and from each other.

5. The device for depalletizing tiers of articles as set forth in claim 1 further comprising:
said means for lowering said elevator clamp including,
(i) an electric motor,
(ii) a chain connecting said electric motor to said elevator clamp for raising and lowering said elevator clamp upon being activated,
switch means carried by said elevator clamp for stopping the downward movement of said elevator clamp by deactivating said motor upon striking said top tier of articles, and for activating said plurality of pneumatic cylinders for closing said side walls of said clamp gripping said top tier therebetween.

6. A device for depalletizing tiers of articles located on a pallet, one tier at a time, and depositing said articles on a receiving table comprising:
an elevator clamp means for moving a tier of articles which extends over said pallet including,
(i) four interdependent spaced side walls carried in a substantially rectangular configuration, each side wall having a first and a second end, and a clamping surface generally between said first and second ends for engaging said articles arranged in a rick-rack order;
(ii) means for selectively moving said walls between a closed position and an opened position so that said first ends of said side walls move inwardly past the second ends of said side walls to provide a progressively reducing rectangular clamping area and a uniform clamping force for clamping and retaining said articles together in a rick-rack order to be picked up in said tier;
elevator means for lowering said elevator clamp in an opened position to a position wherein said side walls of said clamp encompass the top tier of articles on said pallet; and
means for raising said elevator clamp with said tier of articles and moving said elevator clamp with said articles over a receiving table and depositing said articles on said receiving table 7. The device for depalletizing tiers of articles as set forth in claim 6 further comprising:
a pair of positioning walls carried on opposed sides of said receiving table;
means for moving at least one of said positioning walls between an opened and closed position for varying the spacing between said positioning walls;
said positioning walls being moved to an opened position for receiving said articles on said receiving table and being moved to a closed position for centering said articles on said table.

8. A device for depalletizing tiers of articles located on a pallet, one tier at a time, and depositing said articles on a receiving table comprising:
conveyor means for moving said pallet horizontally to an unloading position;
a first sensing means for stopping said conveyor means when said pallet is in said unloading position;
an elevator clamp means for moving the top tier of articles which extends over said pallet including,
(i) four interdependent spaced side walls carried in a substantially rectangular configuration;
(ii) means for selectively moving said side walls between a closed position and an opened position;
elevator means for vertically moving said elevator clamp means in an opened position to a position wherein said side walls of said elevator clamp encompass the top tier of articles on said pallet, said elevator means including,
(i) a vertically extending frame;
(ii) a drive motor;
(iii) a drive transmission means driven by said driven motor for supporting and vertically moving said elevator clamp;
means for raising said elevator clamp with said top tier of articles to a predetermined height;
second sensing means for stopping upward movement of said elevator means when said predetermined height is attained by said elevator clamp;
means for horizontally moving said elevator clamp with said top tier of articles to a position over said receiving table; and
a third sensing means for stopping horizontal movement of said elevator clamp in said position over said receiving table.

9. The device set forth in claim 8 further comprising:
a driven table top conveyor positioned adjacent said receiving table;
a wiper arm means extending over said receiving table for selectively moving said articles off said receiving table onto said table top conveyor when activated, and sensing means activating said wiper arm means when sufficient space is provided on said table top conveyor for receiving additional articles.

10. The device for depalletizing tiers of articles as set forth in claim 8 further comprising:
a pair of positioning walls carried on opposed sides of said receiving table;
means for moving at least one of said positioning walls between an opened and closed position for varying the spacing between said positioning walls;
said positioning walls being moved to an opened position for receiving said articles on said receiving table and being moved to a closed position for centering said articles on said table.

11. The device for depalletizing tiers of articles as set forth in claim 8 further comprising:
said means for opening and closing said side walls including a plurality of pneumatic cylinders pivotally connected to said side walls of said clamp for selectively moving said side walls to and from each other.

12. The device for depalletizing tiers of articles as set forth in claim 11 further comprising:
switch means carried by said elevator clamp for stopping the downward movement of said elevator clamp by deactivating said motor upon striking said top tier of articles, and for activating said plurality of pneumatic cylinders for closing said side walls of said clamp gripping said top tier therebetween.

13. The device for depalletizing tiers of articles as set forth in claim 8 further comprising:
said side walls each having a first and a second end, bearing means at said first end, a clamping surface between said first and second end, said bearing means of said side wall bearing against said clamping surface of a next adjacent side wall and being arranged so that in the opening and closing of said elevator clamp, said bearing means of each said side wall bears on and moves against said clamping surface of said next adjacent side wall so that said first ends of said side walls move inwardly past the second ends of said side walls to provide a uniform clamping force against said articles.

* * * * *